(12) United States Patent
Lee

(10) Patent No.: US 7,051,846 B2
(45) Date of Patent: May 30, 2006

(54) DISC BRAKE FOR VEHICLES

(75) Inventor: Jong-Chan Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 54 days.

(21) Appl. No.: 10/749,235

(22) Filed: Dec. 30, 2003

(65) Prior Publication Data

US 2005/0045435 A1  Mar. 3, 2005

(30) Foreign Application Priority Data

Aug. 30, 2003  (KR) .................. 10-2003-0060579

(51) Int. Cl.
*B60H 1/22* (2006.01)
*F16D 66/00* (2006.01)

(52) U.S. Cl. ...................... 188/161; 188/158

(58) Field of Classification Search ........ 188/156–164, 188/264 R, 264 G; 303/124; 318/376; 310/93
See application file for complete search history.

(56) References Cited

U.S. PATENT DOCUMENTS

| | | | |
|---|---|---|---|
| 3,014,116 A | | 12/1961 | MacArthur |
| 3,767,015 A | * | 10/1973 | Odier ..................... 188/71.6 |
| 4,460,253 A | * | 7/1984 | Kawai et al. ............. 396/258 |
| 4,667,781 A | | 5/1987 | Lilley et al. |
| 4,668,886 A | * | 5/1987 | Marandet et al. ........... 310/93 |
| 5,266,773 A | | 11/1993 | Granborg |
| 5,485,901 A | * | 1/1996 | Akima et al. .............. 188/164 |
| 5,746,294 A | * | 5/1998 | Lee ........................ 188/163 |
| 5,821,712 A | * | 10/1998 | Fittje ....................... 318/376 |
| 5,839,800 A | * | 11/1998 | Koga et al. ................ 303/152 |
| 5,982,063 A | * | 11/1999 | Lutz et al. .................. 310/77 |
| 6,119,828 A | * | 9/2000 | Parsons ................. 188/250 E |
| 6,439,355 B1 | * | 8/2002 | Kimble .................... 188/171 |
| 6,619,760 B1 | * | 9/2003 | Anwar ...................... 303/20 |

FOREIGN PATENT DOCUMENTS

| | | |
|---|---|---|
| DE | 2 003 447 | 7/1970 |
| DE | 40 07 078 A1 | 9/1991 |
| DE | 198 46 392 A1 | 4/2000 |
| JP | 2001113938 * | 4/2001 |
| KR | 1001794860000 | 11/1998 |

* cited by examiner

*Primary Examiner*—Christopher P. Schwartz
(74) *Attorney, Agent, or Firm*—Morgan Lewis & Bockius LLP

(57) ABSTRACT

An electric heat-generating circuit installed within disc brakes of vehicles to generate heat and dry the discs when current flows. An electromagnetic induction unit generates a current to the electric heat-generating circuit by using an electromagnetic induction phenomenon via the formation of a magnetic field. Therefore, a power can be supplied to discs by a wireless method using electromagnetic induction phenomenon, thereby enabling the brakes to maintain a dry state even during operation under wet conditions.

10 Claims, 3 Drawing Sheets

DISC BRAKE FOR VEHICLES

CROSS-REFERENCE TO RELATED APPLICATIONS

This application claims priority to Korean Application No. 10-2003-0060579, filed on Aug. 30, 2003, the disclosure of which is incorporated fully herein by reference.

FIELD OF THE INVENTION

Generally, the present invention relates to a disc brake. More particularly, to a disc brake for vehicles adapted to supply power to discs via a wireless method using electromagnetic induction, thereby keeping the brakes dry under wet road conditions.

BACKGROUND OF THE INVENTION

Typically, an oil hydraulic brake is composed of a brake pedal, a distributing device, a master cylinder, a brake pipe, a wheel cylinder and a wheel brake. The wheel brake includes both disc brakes and a drum brakes. Modem vehicles use disc brakes, and in particular, disc brakes are used mostly for front wheels.

However, there is a problem in the disc brakes thus described in that discs and pads of the disc brakes tend to become wet during wet road conditions and cause slippage between the discs and the pads when a brake pedal is depressed. Thus hindering the vehicle from properly stopping.

SUMMARY OF THE INVENTION

The present invention provides a disc brake for vehicles configured to be installed with an electric heat-generating circuit at a disc to give rise to generation of an induction current to the electric heat-generating circuit by using electromagnetic induction. Thereby the disc is supplied with electricity via a wireless method to keep the brakes dry under wet road conditions.

In accordance with a preferred embodiment of the present invention, a disc brake for vehicles comprises a round disc rotating with a wheel, pads installed at both sides of the disc for generation of frictional force, a pincer-shaped caliper supporting the pads, an electric heat-generating circuit installed within the discs to generate heat and dry the discs when current flows, and electromagnetic induction means for generating a current to the electric heat-generating circuit by using electromagnetic induction via formation of a magnetic field.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENT

Figure 1:
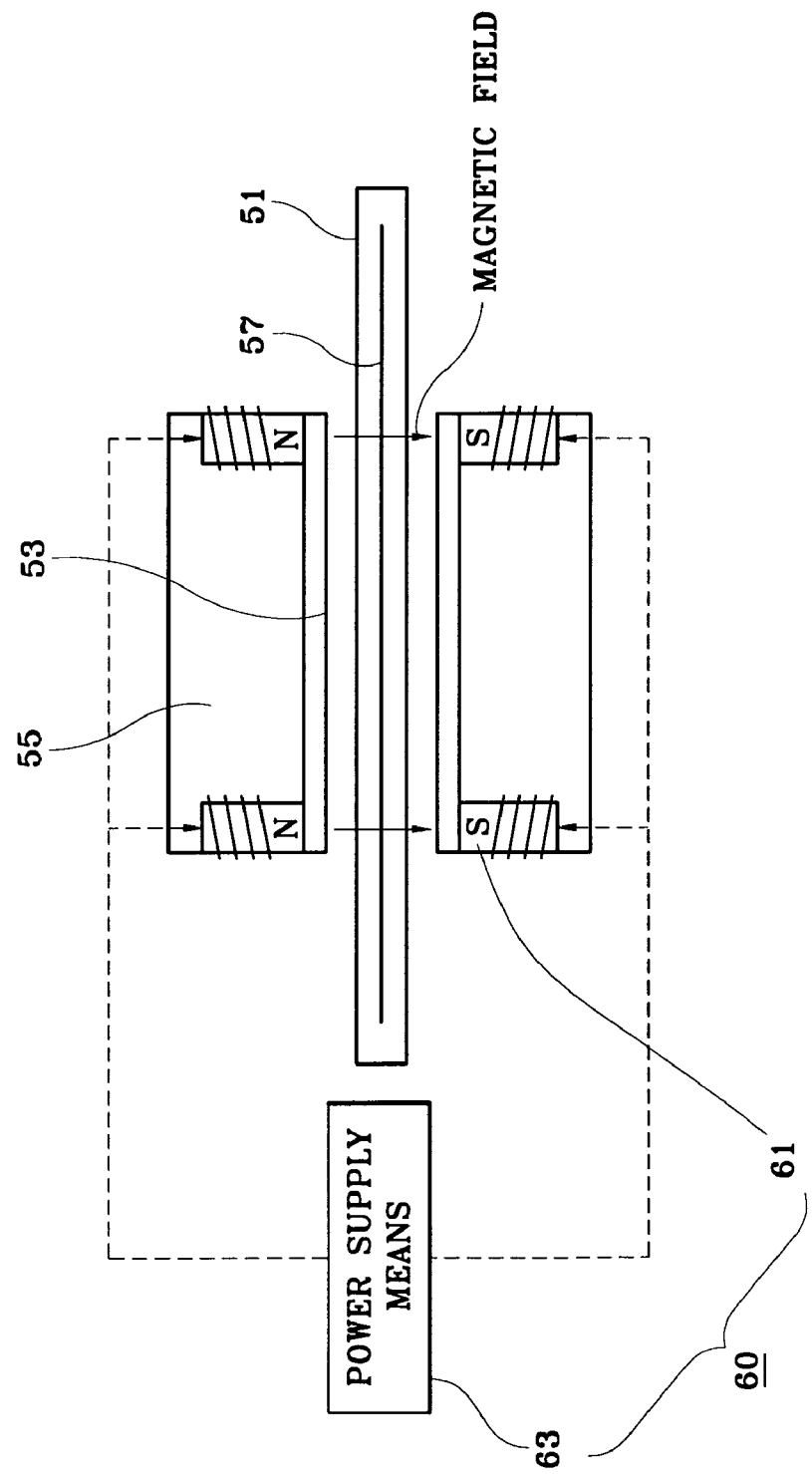
FIG. 1 is a schematic block diagram illustrating a principal element of a disc brake according to an embodiment of the present invention.
Figure 2:
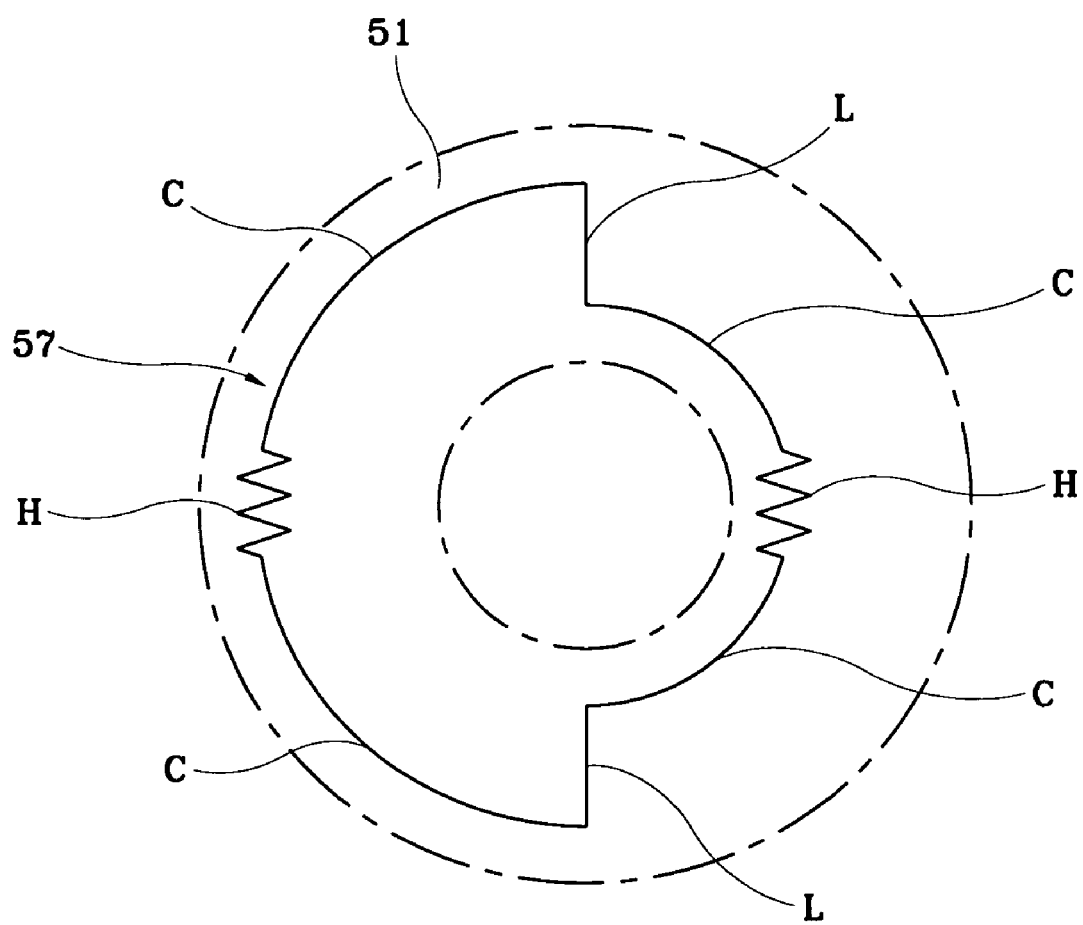
FIG. 2 is a schematic block diagram illustrating an electric heat-generating circuit according to an embodiment of the present invention.
Figure 3:
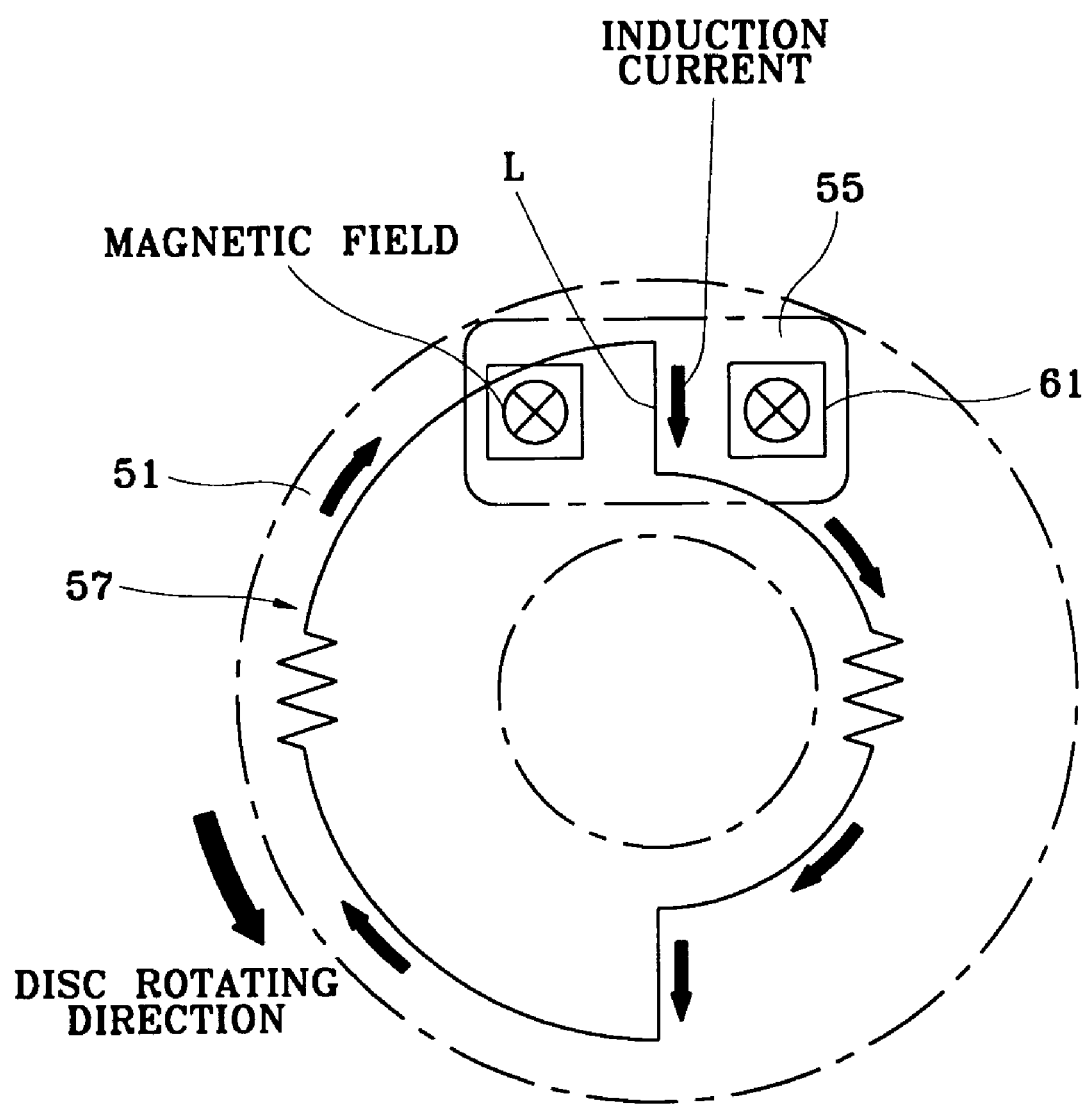
FIG. 3 is a reference drawing for explaining generation of an induction current according to an embodiment of the present invention.

As shown in FIGS. 1, 2 and 3, a disc brake of an oil hydraulic brake system includes a round disc 51 rotating with a wheel, pads 53 installed at both sides of the disc 51 for generating frictional force, a pincer-shaped caliper 55 supporting the pad 53, an electric heat-generating circuit 57 installed within the disc 51 to generate heat and dry the disc 51 when current flows, and electromagnetic induction means 60 for generating a current to the electric heat-generating circuit 57 by using electromagnetic induction via formation of a magnetic field.

The electromagnetic induction means 60 includes electromagnets 61 each installed at both prongs of the caliper 55 to allow an N pole and a S pole to face therebetween. Therefore, when electric power is applied, a magnetic field can be formed in the axial direction of the disc 51 and electric power supply means 63 supplying the electric power to the electromagnets 61 for magnetization thereof The electromagnets 61 are evenly distributed at both prongs of the caliper 55.

The electromagnets 61 are installed to be automatically magnetized when a wetness measuring sensor installed inside a brake, for measuring wetness, discriminates that the disc 51 and the pads 53 become drenched above a prescribed level. The sensor can also be connected to a relay of a windscreen wiper to be magnetized in the same manner as that of the operation frequency of the wiper. The reason for magnetizing the electromagnets 61 in response to the operation frequency of the wiper is that the operation frequency of the wiper increases as rainfall increases while the brakes become more wet.

Between the disc 51 and the electric heat-generating circuit 57, there is disposed an insulating body for insulating the electric heat-generating circuit 57 from a body of the disc 51 so that the electric heat-generating circuit 57 can properly function. The electric heat-generating circuit 57 includes at least more than one linear part (L) passing the magnetic field to generate an induced electromotive force so that a current can flow in the circuit, at least more than one heat-generating part (H) supplied with the current generated by the linear part (L) to generate heat, and a curved part (C) connecting the linear part (L) and the heat-generating part (H).

The linear part (L) is radially formed around the disc 51 in order to generate a maximum induced electromotive force, and the curved part (C) is formed along a route of concentric circle towards a circumferential direction of the disc 51 so that induced electromotive force is not generated. In case the linear part (L) is plurally formed, linear parts (L) formed toward the outside from the center of the disc 51 and linear parts (L) formed toward the center from the outside of the disc 51 are alternatively and repeatedly constituted. Each linear part (L) is formed at a prescribed interval therebetween so that no two linear parts (L) that show different directions of current flow under a magnetic field can simultaneously pass the magnetic field.

In case the linear parts (L) and the heat-generating parts (H) are plurally installed, the linear parts (L) and the heat-generating parts (H) are evenly distributed on the entire disc 51. The heat-generating parts (H) are made of a hot wire material on heated glass or heat-generating wire of a heater that generates heat when applied with current.

When the disc brake thus constructed becomes drenched under wet road conditions, electric power is applied to the power supply means 63 to magnetize the electromagnets 61.

When the electromagnets 61 are magnetized, a magnetic field is formed to an axial direction of the disc 51 in between the discs 51, and once the linear parts (L) of the electric heat-generating circuit 57 pass the magnetic field thus formed, an induced electromotive force is generated from the linear parts (L) according to Fleming's law to cause a current to flow in the circuit.

When the induced current generated from the linear parts (L) moves along the curved parts (C) to reach the heat-generating parts (H), the heat-generating parts (H) generate heat, which in turn dries the disc 51.

The present invention thus described can be used side by side with the pad-heating method for heating a pad 53 via a wired method by supplying electric power to a heat-generating body installed at the pad 53, thus effectively drying the disc.

The electric power supplied to the heat-generating body of the pad 53 is preferably supplied at the same time from the power supply means 63 for supplying power to the electromagnets 61. In other words, branches from wirings connected for supplying power to the electronic magnets 61 are connected the heat-generating body of the pad 53 for supplying power to the heat-generating body.

As apparent from the foregoing, there is an advantage in the disc brake for vehicles thus described according to the embodiment of the present invention in that an induction current can be generated in an electric heat-generating circuit of a disc using electromagnetic induction such that self-generating electricity is produced from the electric heat-generating circuit of disc without recourse to a wired method for supplying power to thereby enable to dry the brakes even while a vehicle is in motion during wet road conditions to improve the braking performance of the brake. There is another advantage in that electric power is automatically supplied to the electric heat-generating circuit by a wetness measuring sensor or by operation frequency of wipers during rainy conditions such that a separate manipulating operation is not needed for drying the brakes while a vehicle is in motion.

The foregoing description of the preferred embodiment of the present invention has been presented for the purpose of illustration and description. It is not intended to be exhaustive or to limit the invention to the precise form disclosed, and modifications and variations are possible in light of the above teachings or may be acquired from practice of the invention. It is intended that the scope of the invention be defined by the claims appended hereto, and their equivalents.

What is claimed is:

1. A disc brake for vehicles comprising:
    a round disc rotating with a wheel;
    pads installed at both sides of said disc for generating frictional force;
    pincer-shaped calipers supporting said pads;
    an electric heat-generating circuit installed within said discs to generate heat and dry said disc when current flows; and
    electromagnetic induction means for generating a current to said electric heat-generating circuit by using electromagnetic induction via formation of a magnetic field wherein said electromagnetic induction means comprises:
        electromagnets, each installed in both prongs of said caliper to allow an N pole and a S pole to face therebetween, such that when electric power is applied, a magnetic field can be formed in the axial direction of said disc; and
        electric power supply means supplying electric power to said electromagnets for magnetization thereof.

2. The disc brake as defined in claim 1, wherein said electric heat-generating circuit comprises:
    at least more than one linear part passing the magnetic field to generate an induced electromotive force so that a current can flow in said circuit;
    at least more than one heat-generating part supplied with the current generated by said linear part to generate heat; and
    a curved part connecting said linear part and said heat-generating part.

3. The disc brake as defined in claim 2, wherein said linear part is radially formed around said disc.

4. The disc brake as defined in claim 2, wherein each linear part is formed at a prescribed interval therebetween so that no two linear parts that show different directions of current flow under a magnetic field can simultaneously pass the magnetic field.

5. The disc brake as defined in claim 2, wherein said linear parts and said heat-generating parts are evenly distributed on said entire disc when said linear parts and said heat generating parts are plurally installed.

6. The disc brake as defined in claim 2, wherein said heat-generating parts are made of a hot wire material that generates heat when applied with current.

7. The disc brake as defined in claim 2, wherein said curved part is formed along a concentric circle route toward a circumferential direction of said disc.

8. The disc brake as defined in claim 1, wherein said electromagnets are evenly distributed at both prongs of said caliper.

9. The disc brake as defined in claim 1, wherein said electromagnets are so installed as to be automatically magnetized when a wetness measuring sensor installed inside a brake for measuring wetness discriminates that discs and pads become drenched above a prescribed level.

10. The disc brake as defined in claim 1, wherein said electromagnets are connected to a relay of a wiper so as to be magnetized by operation frequency of said wiper.

* * * * *